United States Patent
Stringari

[19]

[11] Patent Number: 6,101,729
[45] Date of Patent: Aug. 15, 2000

[54] POWER SAW GUIDE

[76] Inventor: Frank L. Stringari, 3829 Alabama St., San Diego, Calif. 92104

[21] Appl. No.: 09/076,341

[22] Filed: May 11, 1998

Related U.S. Application Data

[63] Continuation-in-part of application No. 08/535,352, Sep. 28, 1995, Pat. No. 5,915,808.

[51] Int. Cl.$^7$ .................................................. B43L 13/00
[52] U.S. Cl. ................................ 33/474; 33/427; 33/630; 33/640; 83/745
[58] Field of Search ........................... 33/481, 419, 427, 33/429, 474, 478, 480, 484, 485, 486, 625, 628, 630, 640; 83/745, 471.2

[56] References Cited

U.S. PATENT DOCUMENTS

| | | | |
|---|---|---|---|
| 1,246,768 | 11/1917 | Michie | 33/419 |
| 2,772,707 | 12/1956 | Leino | 33/427 |
| 3,296,702 | 1/1967 | Feddish | 33/427 |
| 3,751,816 | 8/1973 | Hayes | 33/474 |
| 4,054,077 | 10/1977 | Gram | 83/745 |
| 4,056,028 | 11/1977 | Patterson | 83/745 |
| 4,843,728 | 7/1989 | Francis | 33/640 |
| 4,961,360 | 10/1990 | Peel et al. | 83/745 |
| 5,226,345 | 7/1993 | Gamble | 83/745 |
| 5,915,808 | 6/1999 | Stringari | 33/474 |

*Primary Examiner*—Christopher W. Fulton
*Attorney, Agent, or Firm*—Fitch, Even, Tabin & Flannery

[57] ABSTRACT

An apparatus and method of using a power saw guide for use with a power saw having a sole plate with a fence-following surface spaced a set distance from a sawing plane of the power saw. The power saw guide comprising a long leg and a short leg that are mutually orthogonal legs defining an "L" shape. A permanently attached fence is located along the outer edge of each leg defining a sole-sliding edge to guide the fence-following surface of the saw. Each fence is located on opposite surfaces of the guide Opposite the sole-sliding edge of the fence, is a plank-contact edge that makes contact with plank edge and ensures the cutting of the plank is done perpendicular to the length. An apron gusset extends beyond the intersection of the legs in both mutually orthogonal directions. The apron gusset is aligned with the plank-contact edges of the fences. Since the set distance for each power saw is different, the apron gusset initially has a length that exceeds the set distance. The power saw is used to cut the apron gusset to the set distance, whereby the cut edge of the apron gusset thereafter precisely locates the position of the sawing plane relative to the fence-following surface.

16 Claims, 3 Drawing Sheets

POWER SAW GUIDE

This application is a Continuation-In-Part of application Ser. No. 08/535,352 filed Sep. 28, 1995, now U.S. Pat. No. 5,915,808 which application is incorporated herein by reference.

BACKGROUND OF THE INVENTION

The present invention relates to field of carpentry accessories, and particularly to techniques for guiding a power saw to cut wood, and more particularly to a power saw guide used in combination with a power saw to cut off an orthogonal length of wooden plank.

When working with wood planking, there is a need to cut the planks to length at a right angle. There are many ways of cutting the plank such as a table saw or radial arm saw. These types of saws are sometimes too large and expensive for the average carpenter to carry to the job site. The typical carpenter uses a hand held circular or power saw when cutting a plank to length.

There are a number of accessories that can assist the carpenter in establishing right angles, miter cuts, space parallel cuts and so forth. For the carpenter to use an accessory, it must be simple, lightweight, durable and compact to be accepted by the trade since the tradesman can already do anything he needs to do with the tools that he has. For the carpenter or tradesman to add a new tool or replace an existing tool with the new tool, the new tool must successfully solve one or more small inconveniences from the job without adding pounds or cubic inches to the tool mass.

One such small inconvenience arises when the carpenter needs to cut off an orthogonal length of a plank. Traditionally, the way this is done is by laying a flat carpenter's square on the plank with one leg along the length of the plank and the other leg laying across the plank. Next the carpenter makes a transverse pencil line across the plank the whole run of the cutoff path. Then a saw, usually a hand-held circular saw used extensively by framing carpenters and the like, is used to follow the line across the plank.

The line is often difficult to follow as it may not have been well lit in the first place, and continued sawdust accumulation along the cut line, and vibration, may obscure the pencil line. The saw blade safety cover also obstructs the cut line, making it difficult to see either the pencil line or the blade at its intersection with the plank, and thus it is hard to be sure the blade path is true to the line. This results in undercuts, overcuts, and angled cuts that were suppose to be orthogonal. On outdoor jobs which rely on sunshine for light, as dusk approaches the visibility of the pencil line becomes more difficult to see. During the cutting of the plank it also becomes increasingly difficult to insure the alignment of the rotating blade and the pencil mark in the flurry of sawdust under the spring-loaded blade guard.

Because right angularity is built into the carpenter's saw, and the distance between the sole plate of the saw and the plane of the blade is constant, one would think there would be a more efficient way of making such saw cuts, and in fact the prior art has developed several devices which are used to establish the angle automatically and enable the saw to be merely moved across the fence or the like to make the cut. Typically these devices may be heavy and stationary, or complicated by the addition of a number of other functions.

In view of the above, it is evident that what is needed is a simple lightweight and durable device enabling a perpendicular saw cut to be accurately made on a wooden plank without visual reference to a pencil line drawn on the plank during the saw cut.

SUMMARY OF THE INVENTION

The present invention addresses the above and other needs by providing a power saw guide that is lightweight and durable and when used in combination with a power saw allows perpendicular cutting of wooden planks without the need of visual references while cutting.

The power saw guide is L-shaped with a long leg and a short leg which meet orthogonally and together define directions "X" and "Y". Along each of the legs are fences or guides used to guide the power saw when cutting a plank. Each fence is mounted flush with the outer edge of each leg creating a sole-sliding edge that makes contact with the sole plate of the power saw. Opposite the sole-sliding edge of the fence is a plank-contact edge that makes contact with the plank during the cut and ensures that the cut is perpendicular to the plank length. The fences on each leg are mounted on opposite sides of the power saw guide so when viewed from the top, only one fence can be seen at a time.

On the outer side of the corner, where the two legs intersect, is an apron gusset. The apron gusset gives the power saw guide additional stability by providing additional support and strength to the corner. In some embodiments, the apron gusset may be removable so that it can be replaced if needed. Additionally, the apron gusset prevents the sole plate of the saw from dropping or turning at the end of the cut, which can chip the wood. The apron gusset extends from each of the fences a distance "a". The distance "a" is defined as the distance between the surface of the sole plate that rides against the sole-sliding edge of the fence, and the near plane of the saw blade which defines the plank cut line. The distance "a" can vary between different power saws because the widths of the sole plates vary between different saws. When the power saw guide is first used, the apron gusset extends a distance that exceeds "a". During the first cut, the power saw cuts, and at the same time automatically trims, the apron gusset and fence to the proper distance "a". The power saw guide is then turned over and the same process is repeated to trim the second dimension "a" of the apron gusset.

In use, the plank is marked at the location that is to be cut. The power saw guide is then placed on the plank and the cut edge of the apron gusset is aligned with the cut mark. With his left hand (assuming a carpenter is holding the saw in his/her right hand), the carpenter holds the leg of the guide so that the plank-contact edge of the fence is positioned against the plank. With his right hand, the carpenter positions the saw on the plank so that it makes contact with the sole-sliding edge of the fence. Power is then supplied to the saw, spinning the saw blade as the saw is advanced along the power saw guide, cutting the plank at the desired location.

BRIEF DESCRIPTION OF THE DRAWINGS

The above and other aspects, features and advantages of the present invention will be more apparent from the following more particular description thereof, presented in conjunction with the following drawings wherein.

Below is a list of reference numbers associated with the figures.

| No. | Component |
|---|---|
| 10 | Power Saw Guide |
| 12 | Long Leg |
| 14 | Short Leg |
| 16 | Corner |
| 18 | Power Saw |
| 20 | Fence - Long Leg |
| 22 | Fence - Short Leg |
| 24 | Sole Plate - Power Saw |
| 26 | Blade - Power Saw |
| 28 | Wooden Plank |
| 30 | Sole-Sliding Edge - Fence 20 |
| 32 | Plank-Contact Edge - Fence 20 |
| 34 | Sole-Sliding Edge - Fence 22 |
| 36 | Plank-Contact Edge - Fence 22 |
| 38 | Apron Gusset |
| 40 | Rounded Edge - Apron |

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
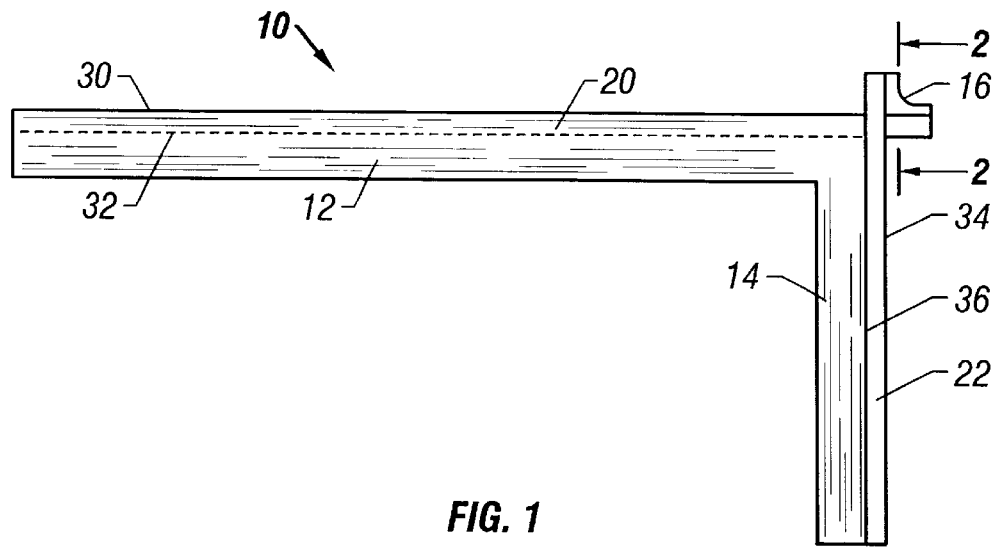
FIG. 1 is a top elevation view illustrating the present invention.

FIG. 1 is a top elevation view illustrating the present invention of an L-shaped power saw guide 10 having a long leg 12 and a short leg 14 which meet orthogonally at a corner 16 and together define directions "X" and "Y".

Figure 2:
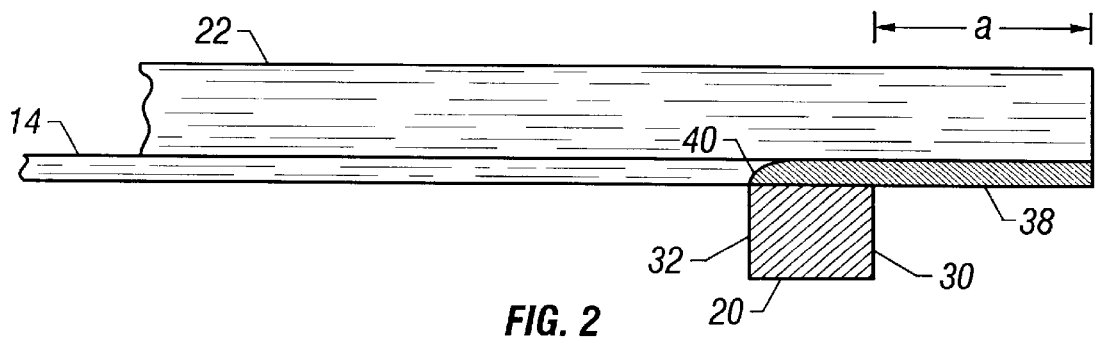
FIG. 2 is a view as seen from line 2—2 of FIG. 1, configured for right handed carpenters.
Figure 5:
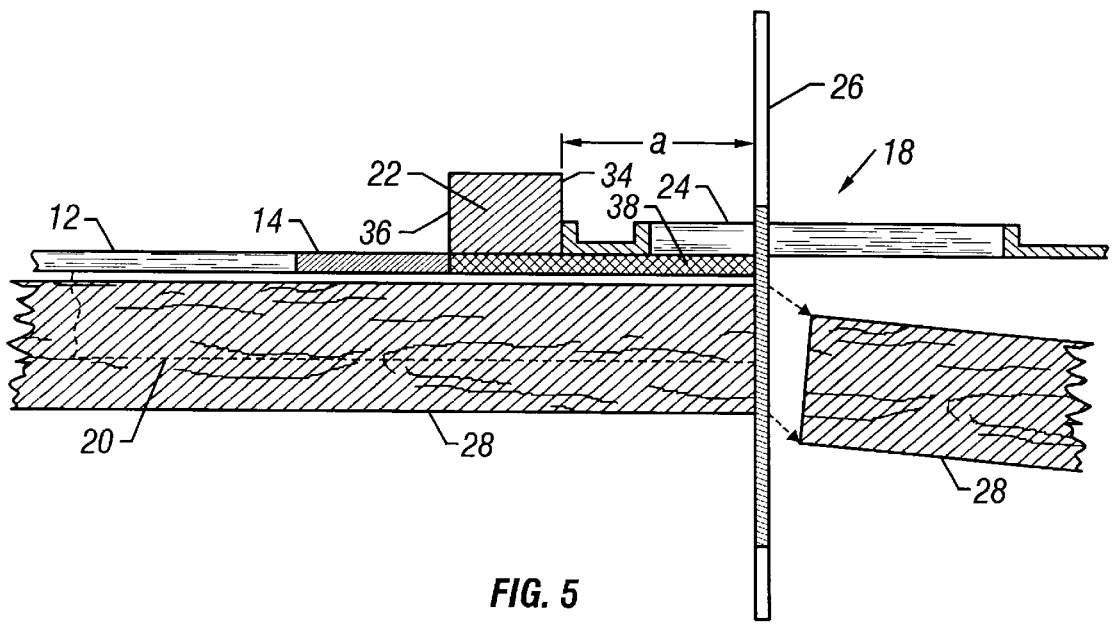
FIG. 5 is a view as seen from line 5—5 of FIG. 4.

Along each of the legs are fences or guides 20 and 22. These fences are used as a guide for a sole plate 24 of the power saw 18 when cutting a plank 28 (as shown in FIG. 5). Referring to FIGS. 1 and 2, the fence 20 is located on the long leg 12, mounted flush with the outer edge creating a sole-sliding edge 30 and an opposite plank-contact edge 32. The fence 22 is located on the short leg 14, mounted flush with the outer edge creating a sole-sliding edge 34 and an opposite plank-contact edge 36. The fence 20 and the fence 22 are mounted on opposite sides of the power saw guide 10 so when viewed from the top, as in FIG. 1, only one fence (in this case fence 22) can be seen at a time.

Figure 3:
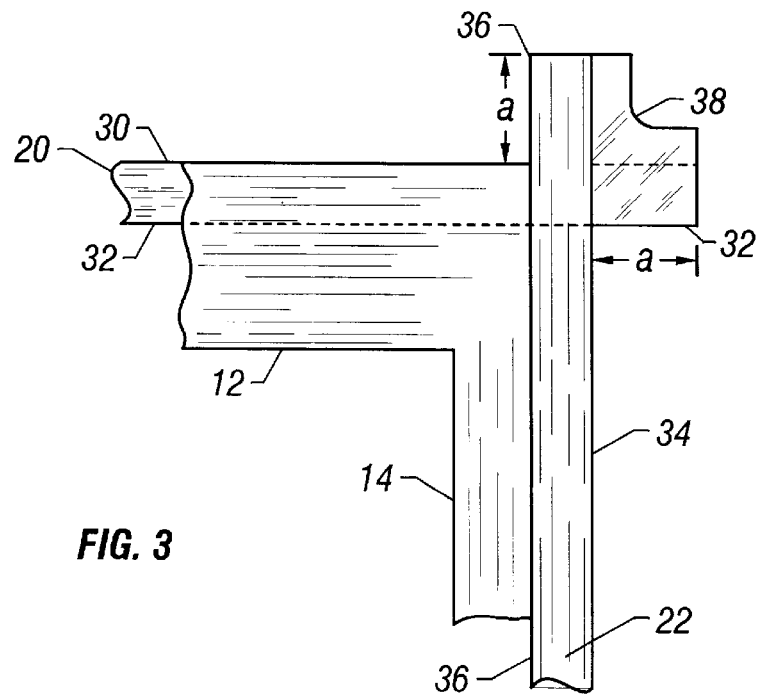
FIG. 3 is a fragmentary top plan view of the corner of the apparatus where the legs meet illustrating the manner in which dimension "a" is taken

FIG. 3 is a fragmentary top plan view showing more detail of the corner 16 where the legs 12 and 14 meet. On the outer side of the corner is an apron gusset 38. The apron gusset 38 gives the power saw guide 10 additional stability by providing additional support and strength to the corner 16. The apron gusset 38 extends from each of the fences 20 and 22 a distance "a". The distance "a" is defined as the distance between the surface of the sole plate 24 that rides against the sole-sliding edge 30 or 34, and the near plane of the saw blade 26 which defines the plank cut line.

The apron gusset 38 is formed as part of the power saw guide 10 and is designed to be slightly elevated above the top surface of the plank being cut (as shown in FIG. 2). The edge of the apron gusset that runs parallel to the plank 28 being cut has a rounded edge 40 on the upper edge of the apron gusset 38 to prevent the sole plate 24 (FIG. 5) from getting caught by the slightly raised apron gusset 38. The apron gusset 38 helps the saw 18 make a clean cut by preventing the saws sole plate 24 from diving forward and down when completing a cut and also holds back the saw blade guard (not shown) until the cut has been complete. In some embodiments, e.g., when the legs of the saw guide 10 are made from metal, or from other materials whenever a tapped screw whole may be formed, the apron gusset 38 may be removable. This facilitate replacement of the apron gusset should it break, and/or should a different gusset, e.g., having a different taper on the rounded edge, or a different thickness, be desired.

There are a variety of ways to manufacture the power saw guide 10. The preferred method of manufacture is one piece injection molding with high impact plastic. This method would create a low cost, highly durable guide 10. An alternate method of manufacture would be to make the components individually and bond them together to form the guide 10. The advantage of the alternate method is that each of the components could be made of a different materials, such as metal, wood or plastic, or composites of metal, wood or plastic, depending on their use. For example the sliding surfaces may be made of steel while the non-sliding surfaces may be made of plastic. The disadvantage of this alternate method is that it would increase cost and weight.

The distance "a" will vary for different power saws 18. When the power saw guide 10 is first used, the apron gusset 38 extends a distance that exceeds "a".

Figure 7:
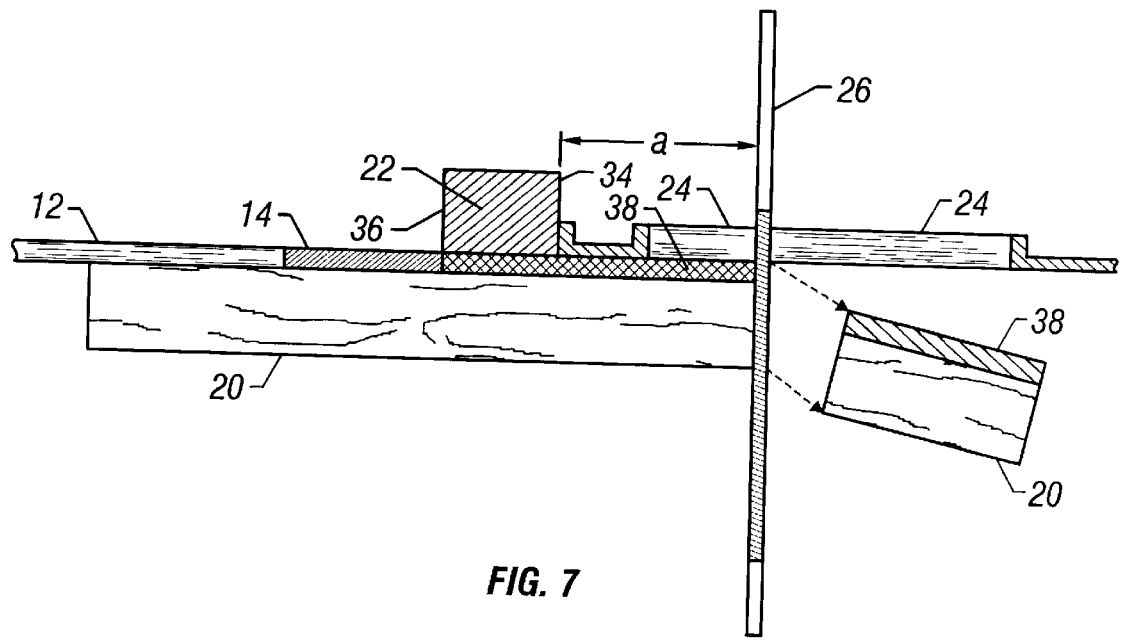
FIG. 7 is a view showing the trimming of the apron and fence to dimension "a" for a particular power saw.

After the apron gusset is trimmed to the correct distance "a", the edge of the gusset may be colored with a bright color, e.g., white, red, orange, green or yellow, in order to help the user easily identify and differentiate such edge from the plank or other material that is being cut. FIG. 7 shows the method of achieving the correct "a" dimension for a given saw 18. The guide 10 is positioned and the power saw 18 is slid along the sole-sliding edge 34 of the fence 22, automatically trimming the apron gusset 38 in the "X" and fence 20 to the proper distance "a". The guide 10 is then turned over and the saw 18 is next slid along the sole-sliding edge 30 of the fence 20, automatically trimming the other side of the apron gusset 38 (the "Y" direction) and fence 22 to the proper distance "a".

Figure 4:
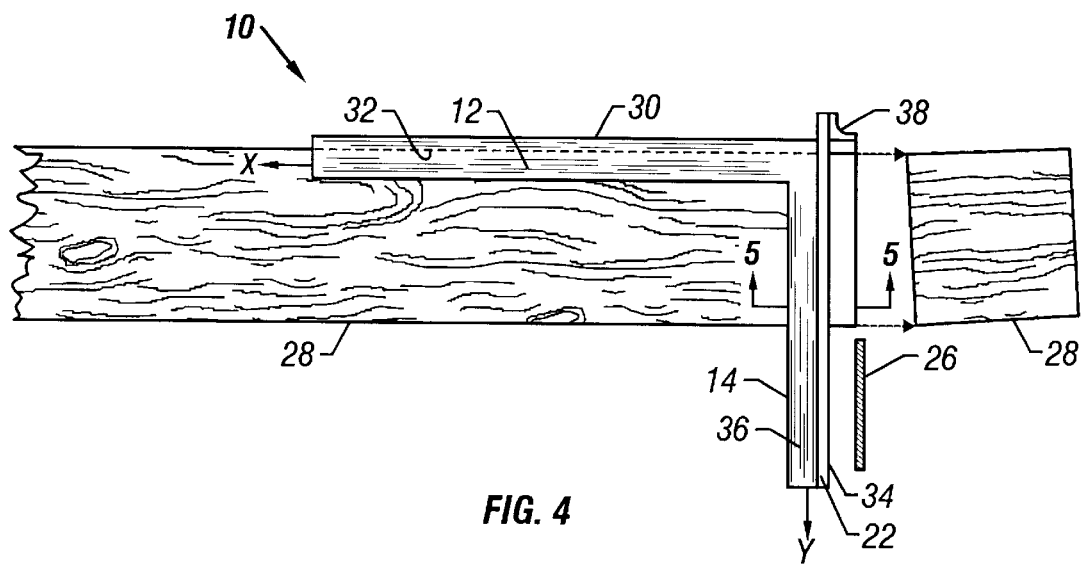
FIG. 4 is a top elevation view illustrating a plank being cross-cut using the present invention.

FIGS. 4 and 5 illustrate the manner in which a right-handed carpenter cuts a plank 28. The plank 28 is first marked at the location that is to be cut. The power saw guide 10 is then placed on the plank 28 and the edge of the apron gusset 38 is aligned with the cut mark. With his left hand, the carpenter holds the long leg 12 in the orientation shown in FIG. 4, the fence 20 being positioned against the plank 28 so that the plank-contact edge 32 makes contact with the plank 28. With his right hand, the carpenter engages the saw 18. The sole plate 24 of the saw 18 is positioned on the plank 28 so that it makes contact with the sole-sliding edge 34. Power is then supplied to the saw 18 to spin the saw blade 26. The saw 18 is then slid along the sole-sliding edge 34 of the fence 22, cutting the plank 18 at the desired location.

Figure 6:
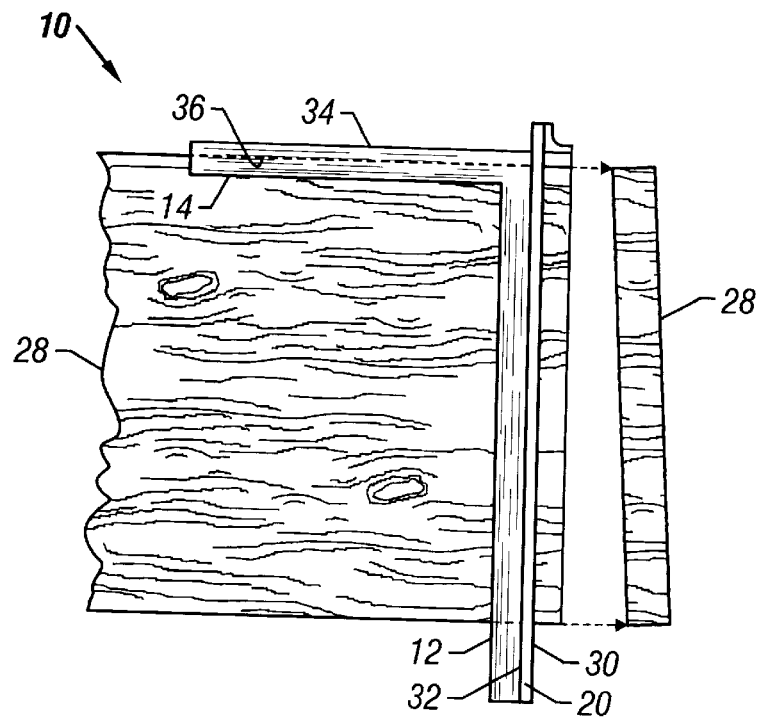
FIG. 6 illustrates the present invention using the longer leg to cut plywood and other wide stock.

FIG. 6 shows a plank 18 that is too wide to use the short leg 14 for guidance. The power saw guide 10 can be flipped the other way such that the carpenter now holds short leg 14 with his left hand, the fence 22 being positioned against the plank, and uses the long leg 12 with fence 20 to guide the saw in his right hand. The method of use would then be the same as described above.

A power saw guide 10 for left handed people may also be made. For left handed users, the fences 20 and 22 are positioned on the opposite faces of the legs 12 and 14 (i.e., the mirror image of the right-handed power saw guide 10) creating a left handed power saw guide.

While the invention herein disclosed has been described by means of specific embodiments and applications thereof, numerous modifications and variations could be made thereto by those skilled in the art without departing from the scope of the invention set forth in the claims.

What is claimed is:

1. A guide for use with a power saw having a sole plate with a fence-following surface spaced a set distance from a sawing plane of the power saw, comprising:
   a first leg and a second leg being mutually orthogonal legs defining an "L" shape, the "L" shape having a front surface and a rear surface;
   a first fence attached along an edge of the first leg defining a sole-sliding edge with an opposite plank-contact edge, a second fence attached along an edge of the second leg defining a sole-sliding edge with an opposite plank-contact edge, the first fence and the second fence being located on opposite surfaces of the "L" shape;
   an apron gusset extending beyond the intersection of each of the legs in both mutually orthogonal directions aligned respectively with the plank-contact edges of the first and second fences, the apron gusset having a length in each direction equal to the set distance whereby the apron gusset precisely locates the position of the sawing plane relative to the sole-sliding edge.

2. The guide as set forth in claim 1 wherein the first leg is longer than the second leg.

3. The guide as set forth in claim 1 wherein the second leg is longer than the first leg.

4. The guide as set forth in claim 1 further comprising:
   the apron gusset initially having a length that exceeds the set distance and being made from a material that can readily be cut by a blade rotating within the sawing plane of the power saw; and
   means for cutting the apron gusset so that the apron gusset thereof extends from the fence-following surface a distance that is equal to the set distance, whereby the cut edge of the apron gusset thereafter precisely locates the position of the sawing plane relative to the fence-following surface.

5. The guide as set forth in claim 4 wherein the edge of the apron gusset after it is cut to the set distance is colored with a bright color.

6. The guide as set forth in claim 1 wherein the first fence is located on the rear surface and the second fence is located on the front surface.

7. The guide as set forth in claim 1 wherein the first fence is located on the front surface and the second fence is located on the rear surface.

8. The guide as set forth in claim 1 wherein the first leg, the second leg, the first fence, the second fence and the apron gusset are made from plastic.

9. The guide as set forth in claim 1 wherein the first leg, the second leg, the first fence, the second fence and the apron gusset are all integral components made from injection molded plastic.

10. The guide as set forth in claim 1 wherein the first leg, the second leg, the first fence, the second fence and the apron gusset are made from wood.

11. The guide as set forth in claim 1 wherein the first leg, the second leg, the first fence, the second fence and the apron gusset are made from metal, plastic or wood.

12. The guide as set forth in claim 1 further comprising:
   a first rounded edge of the apron gusset on the front surface running parallel with the plank being cut; and
   a second rounded edge of the apron gusset on the rear surface running perpendicular with the plank being cut.

13. The guide as set forth in claim 12 wherein the apron gusset is removable.

14. A guide for use with a power saw having a sole plate with a fence-following surface spaced a set distance from a sawing plane of the power saw, comprising:
   a first long leg and a second short leg being mutually orthogonal legs defining an "L" shape, the "L" shape having a front surface and a rear surface;
   a first fence permanently attached along an edge of the first leg defining a sole-sliding edge with an opposite plank-contact edge, a second fence permanently attached along an edge of the second leg defining a sole-sliding edge with an opposite plank-contact edge, the first fence being located on the rear surface and the second fence being located on the front surface;
   an apron gusset extending beyond the intersection of the legs in both mutually orthogonal directions aligned respectively with the plank-contact edges of the first and second fences, the apron gusset initially having a length that exceeds the set distance, and the apron gusset being made from a material that can readily be cut by a blade rotating within the sawing plane of the power saw; and
   means for cutting the apron gusset so that the apron gusset thereof extends from the fence-following surface a distance that is equal to the set distance, whereby the cut edge of the apron gusset thereafter precisely locates the position of the sawing plane relative to the fence-following surface.

15. The guide as set forth in claim 14 wherein the edge of the apron gusset after it is cut to the set distance is colored with a bright color.

16. A method of using a guide with a power saw having a sole plate with a fence-following surface spaced a set distance from a sawing plane of the power saw to cut a piece of wood plank, comprising the steps of:
   (a) marking the wood plank at the location to be cut;
   (b) providing a guide having first long leg with a first fence permanently attached along an edge of the first leg defining a sole-sliding edge with an opposite plank-contact edge and a second short leg with a second fence permanently attached along an edge of the second leg defining a sole-sliding edge with an opposite plank-contact edge, the first and second legs being mutually orthogonal legs defining an "L" shape, the "L" shape having a front surface and a rear surface and the first fence being located on rear surface and the second fence being located on front surface, an apron gusset extending beyond the intersection of the legs in both mutually orthogonal directions aligned respectively with the plank-contact edges of the first and second fences, the apron gusset having a length in each direction equal to the set distance whereby the apron gusset precisely locates the position of the sawing plane relative to the sole-sliding edge;

(c) positioning the guide on the plank so that the rear surface faces the plank and the plank-contact edge of the first fence contacts the plank;

(d) sliding the guide along the plank until the edge of the apron gusset is aligned with the cut mark;

(e) positioning the power saw perpendicular to the plank length such that the fence-following surface of the sole is in contact with the sole-sliding edge of the second fence;

(f) powering the saw cutting blade; and (g) moving the saw across the plank along the sole-sliding edge thereby cutting the plank at the desired cut mark.

* * * * *